(12) United States Patent
Leukers et al.

(10) Patent No.: US 11,912,116 B2
(45) Date of Patent: Feb. 27, 2024

(54) TARPAULIN SUPERSTRUCTURE

(71) Applicant: EUROPEAN TRAILER SYSTEMS GMBH, Moers (DE)

(72) Inventors: Markus Leukers, Kalkar (DE); Mathias Ludwig, Kalkar (DE)

(73) Assignee: EUROPEAN TRAILER SYSTEMS GMBH, Moers (DE)

( * ) Notice: Subject to any disclaimer, the term of this patent is extended or adjusted under 35 U.S.C. 154(b) by 179 days.

(21) Appl. No.: 17/442,186

(22) PCT Filed: Mar. 17, 2020

(86) PCT No.: PCT/DE2020/100211
§ 371 (c)(1),
(2) Date: Sep. 23, 2021

(87) PCT Pub. No.: WO2020/192839
PCT Pub. Date: Oct. 1, 2020

(65) Prior Publication Data
US 2022/0169102 A1 Jun. 2, 2022

(30) Foreign Application Priority Data

Mar. 26, 2019 (DE) .......................... 202019101728.7
Mar. 28, 2019 (DE) .......................... 202019101781.3

(51) Int. Cl.
*B60J 7/06* (2006.01)
*B62D 35/00* (2006.01)

(52) U.S. Cl.
CPC .............. *B60J 7/062* (2013.01); *B60J 7/065* (2013.01); *B62D 35/001* (2013.01)

(58) Field of Classification Search
CPC ......... B60J 7/062; B60J 7/065; B62D 35/001; B62D 35/02; Y02T 10/88
See application file for complete search history.

(56) References Cited

U.S. PATENT DOCUMENTS

| | | | |
|---|---|---|---|
| 4,162,100 A * | 7/1979 | Muscillo | B60J 7/062 |
| | | | 296/100.12 |
| 4,740,029 A | 4/1988 | Tuerk | |
| 5,842,734 A | 12/1998 | Lechner | |

FOREIGN PATENT DOCUMENTS

| | | | | |
|---|---|---|---|---|
| CN | 103863420 A | 6/2014 | | |
| DE | 160103 A1 * | 5/1983 | ............. | B60J 7/061 |
| DE | 214100 A1 * | 10/1984 | | |

(Continued)

*Primary Examiner* — Lori Lyjak
(74) *Attorney, Agent, or Firm* — Jacob M. Ward; Ward Law Office LLC

(57) ABSTRACT

A tarpaulin superstructure is provided for use with a movable substructure, such as a truck, a trailer, a semitrailer, a railway wagon, a dump truck, or a container. The tarpaulin superstructure includes a top frame to which a tarpaulin made of weather-resistant material can be attached, where the top frame has multiple struts which can be moved along one or more guides, and where the end of the top frame has an end runner which can be raised to open the superstructure and lowered to close the superstructure. A tarpaulin superstructure is also provided where the end runner is not lifted by the airstream, as an air deflection part is arranged at an end of the end runner so that the airstream is converted into a force in the closing direction of the end runner.

19 Claims, 2 Drawing Sheets

(56) References Cited

FOREIGN PATENT DOCUMENTS

| | | | |
|---|---|---|---|
| DE | 19602602 A1 | 7/1997 | |
| DE | 102010027716 A1 | 3/2011 | |
| DE | 102012023716 A1 | 6/2014 | |
| DE | 202014005077 U1 * | 11/2014 | ............ B60J 7/065 |
| DE | 102014008951 A1 | 12/2015 | |
| DE | 102016106319 A1 * | 10/2017 | |
| DE | 102016011026 A1 | 3/2018 | |
| DE | 202018104780 U1 * | 10/2018 | ............ B60J 7/061 |
| EP | 2529966 A1 | 12/2012 | |
| EP | 2595861 B1 | 3/2016 | |
| FR | 3016330 A1 | 7/2015 | |
| JP | S494065 B1 | 1/1974 | |
| JP | H0762931 A | 3/1995 | |
| JP | H07108876 A | 4/1995 | |
| JP | H11300335 A | 11/1999 | |
| JP | 2002046474 A | 2/2002 | |
| JP | 2004031186 A | 1/2004 | |
| JP | 2008168843 A | 7/2008 | |
| WO | 2018177841 A1 | 10/2018 | |
| WO | 2018200007 A1 | 11/2018 | |

\* cited by examiner

TARPAULIN SUPERSTRUCTURE

CROSS-REFERENCE TO RELATED APPLICATIONS

This application is a National Stage of International Application No. PCT/DE2020/100211, filed Mar. 17, 2020, which in turn claims the benefit of German Patent Application No. 20 2019 101 781.3, filed Mar. 28, 2019, and German Patent Application No. 20 2019 101 728.7, filed Mar. 26, 2019. The entire disclosures of the above applications are hereby incorporated herein by reference.

FIELD

The invention relates to a tarpaulin superstructure for a movable substructure, such as a truck, a trailer, a semitrailer, a railway wagon, a dump truck or a container.

INTRODUCTION

In practice, tarpaulin superstructures are known in which the tarpaulin is connected to a top frame, the top frame having a plurality of struts which can be moved along a guide which is arranged on the substructure and usually comprises a rail on both sides of the substructure. The guide can be a rail in which carriages provided at the ends of the struts can be moved, but it is also possible for the guide to have a drive, for example a wire driven in circulation, which is connected to the struts. The end of the top frame has an end runner which can be raised to open the superstructure and lowered to close the superstructure. The disadvantage of known tarpaulin superstructures is that, when the substructures are transported, in the region of the end runners which are at the rear in the direction of travel, the airstream causes turbulence from speeds of approx. 60 km/h—or higher—which tends to lift the end runner due to a suction effect. This means that the end runner has to be manually locked, which is often forgotten and is generally not easy to do with sliding roofs. In addition, there are configurations in which safe lifting of the end runner is useful or desired, for example in the case of a dump truck of which the load is dumped, since otherwise the dumped load would damage the top frame. The pivoting of the tailgate of the dump truck also requires the end runner to be lifted, because the two parts would otherwise interfere with one another.

In practice, air deflection parts are known which are attached to the rear of passenger vehicles in order to increase the contact pressure of the vehicle on its rear axle at very high speeds.

DE 10 2012 023 716 A1 describes a tarpaulin superstructure for a movable truck, in which a cover, in which a tarpaulin made of weather-resistant material is connected to a top frame. The top frame here has a plurality of struts which can be adjusted in height along a vertical guide, and thereby reduce the air resistance. The struts can have an airflow-directing geometry. The disadvantage of the known tarpaulin superstructure is the fact that no openable top is provided, but rather the struts are fixed in vertical supports; such that it is not possible to have a sliding roof which is intended to be opened, which makes loading difficult.

DE 196 02 602 A1 describes a commercial vehicle superstructure in which the rear is sloped downward in order to have more favorable wind resistance.

DE 10 2010 027 716 A1 describes a superstructure for a truck, in which the superstructure is designed to be height-adjustable and can optionally assume an aerodynamically favorable drop shape.

SUMMARY

It is the object of the invention to provide a tarpaulin superstructure of which the end runner is not lifted by the airstream.

This object is achieved according to the invention by a tarpaulin superstructure having a top frame to which a tarpaulin made of weather-resistant material can be attached. The top frame can include a plurality of struts which can be moved along at least one guide, an end runner which can be raised to open the superstructure and lowered to close the superstructure, and an air deflection part provided at an end of the end runner to convert an airstream into a force in the closing direction of the end runner.

The tarpaulin superstructure according to the invention for a movable substructure, such as a truck, a trailer, a semitrailer, a railway wagon, a dump truck or a container, comprises a top frame to which a tarpaulin made of weather-resistant material is attached, wherein the top frame comprises a plurality of struts which can be moved along at least one guide. Here, the end of the top frame comprises an end runner which can be raised to open the superstructure and lowered to close the superstructure. The tarpaulin superstructure distinguishes in that an air deflection part is arranged at an end of the end runner, by means of which air deflection part the airstream is converted into a force in the lowering or closing direction of the end runner. This reliably ensures that the end runner is pushed in the closing direction when certain speeds are exceeded, even if this slightly increases the air resistance of the superstructure as a whole. Advantageously, it is then no longer necessary to manually lock the end runner, which can also be located at a height of several meters. The problems associated with locking and releasing the lock, such as jamming of the latches or misaligned latch members, are thus effectively eliminated. This also ensures that, when a substructure designed as a dump truck is tipped, the end runner always pivots away from the substructure due to the force of gravity alone, without the superstructure having to be opened separately, either completely or partially.

The air deflection part is expediently arranged at the distal end of the end runner, where the lever arm for its articulation is large, so that only a small supernatant generates a large closing moment. Alternatively, it is possible to arrange the air deflection part in the lateral regions of the end runner. In particular, it is possible to provide a plurality of air deflection parts on the end runner, the air deflection parts expediently being distinguished in that they protrude vertically over the tarpaulin of the tarpaulin superstructure in order to achieve a force directed vertically downward.

The supernatant of the deflection part over the superstructure is expediently not exceeding 50 mm, measured in the projection onto a vertical plane. This reduces the risk of injury and ensures that the superstructure can be used easily in traffic.

It is not necessary for the air deflection parts themselves to be oriented vertically. It is sufficient if a vertical component opposes the airstream and thus achieves a downward contact pressure or contact force on the end runner.

The air deflection part is expediently arranged on the outside of the tarpaulin, so that the airstream acts directly on the air deflection part and thus presses the end runner downward. Alternatively, the air deflection part can also be arranged beneath the tarpaulin, which then spans the air deflection part.

The air deflection part is preferably connected to the end runner, with connecting means provided for connecting the air deflection part to the end runner penetrating the tarpaulin. If the air deflection part is therefore riveted to a distal strut, such as a cross member of the end runner, the rivets penetrate the tarpaulin and thereby reliably secure the tarpaulin to the end runner, for example to the cross member.

A favorable design is obtained when the air deflection part comprises a connecting portion and an air guiding portion, the air guiding portion protruding upward over the tarpaulin. This advantageously ensures that the air guiding portion is in the airstream and introduces a force in the closing direction into the end runner via the connecting portion.

The air guiding portion is expediently folded away with respect to the connecting portion, with the angle of the folding expediently being dimensioned to be greater than 90° and less than 180°. In this way, for example, an angle of attack of the air guiding portion relative to the horizontal of approximately 30° to 70°, preferably between 45° and 60° and in particular of 50° can be achieved.

In an expedient development, the air guiding portion comprises openings and/or cutouts. The openings can be designed as a hole pattern, for example, in order to reduce the contact pressure to such an extent that air resistance is not unnecessarily high. In an advantageous embodiment, the openings can also contain the logo of the manufacturer of the superstructure. Alternatively and/or cumulatively, cutouts can also be provided in the air guiding portion in order to reduce fuel consumption. It is not necessary for the air guiding portion to be connected to the end runner over the entire width of said runner. Rather, the air guiding portion may make up only part of the width of the end runner.

The air deflection part is expediently designed as a steel part that is not deformed even at higher speeds. Alternatively, it is possible to design the air deflection part as a plastics part, which poses a lower risk of injury in the event of an accident or a collision.

The air guiding portion expediently does not protrude beyond the maximum height of the tarpaulin superstructure when the tarpaulin superstructure is closed, in order to avoid reducing the overall loading height due to licensing regulations.

In an expedient embodiment, the air deflection part generates a contact force of between 30 N and 300 N, preferably of between 50 N and 150 N, and expediently of no more than 100 N on the end runner in the closing direction at a driving speed of 50 km/h. As a result of these comparatively low contact forces, it is already ensured that the end runner is not lifted due to turbulence, even if it is not locked to the substructure and/or the tarpaulin superstructure.

The end runner is expediently articulated on the top frame so that it can be pivoted up and down easily.

The end runner is expediently designed without locking, and so there is no possibility of locking the end runner to the substructure or the top frame. This advantageously ensures that the superstructure can be opened at any time without unlocking, which is particularly useful in the case of a dump truck that dumps its load via a tailgate, since the pivoting path of the tailgate would collide with the region covered by the end runner if the end runner did not lift off due to gravity.

According to a favorable development, the top frame is motor-driven in order to open or close the tarpaulin superstructure. The motor drive takes place in this case from the driver's cab of a vehicle or from the ground and thus at a significant distance from the plane of the tarpaulin superstructure, and so manual locking or unlocking is problematic with a motor drive.

The tarpaulin superstructure is expediently designed as a sliding roof for a truck, a trailer, a semitrailer, a railway wagon, a dump truck or a container, and the tarpaulin superstructure can also be built over the substructure, for example if the struts are U-shaped. It is possible to interconnect the adjacent struts in the region of their connections to the guide, in particular in the region of their carriages, using tarpaulin folding aids, the tarpaulin folding aids being designed as U-shaped bows or as plastics folding elements arranged in the region of the guide.

The invention includes the surprising finding that an air deflection part, which is not required to transfer forces to the axle of the transport vehicle, actually prevents an unlocked tailgate from lifting or rattling under the influence of the airstream.

An aspect of the invention relates to the use of an air deflection part which is connected to an end runner of a tarpaulin superstructure in order to secure it against unintentional rattling or lifting in an airstream.

Further advantages, features, properties and developments of the invention emerge from the following description of a preferred embodiment and from the dependent claims.

DESCRIPTION OF THE DRAWINGS

The invention will be explained below with reference to the accompanying drawings on the basis of a preferred embodiment.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

Figure 1:
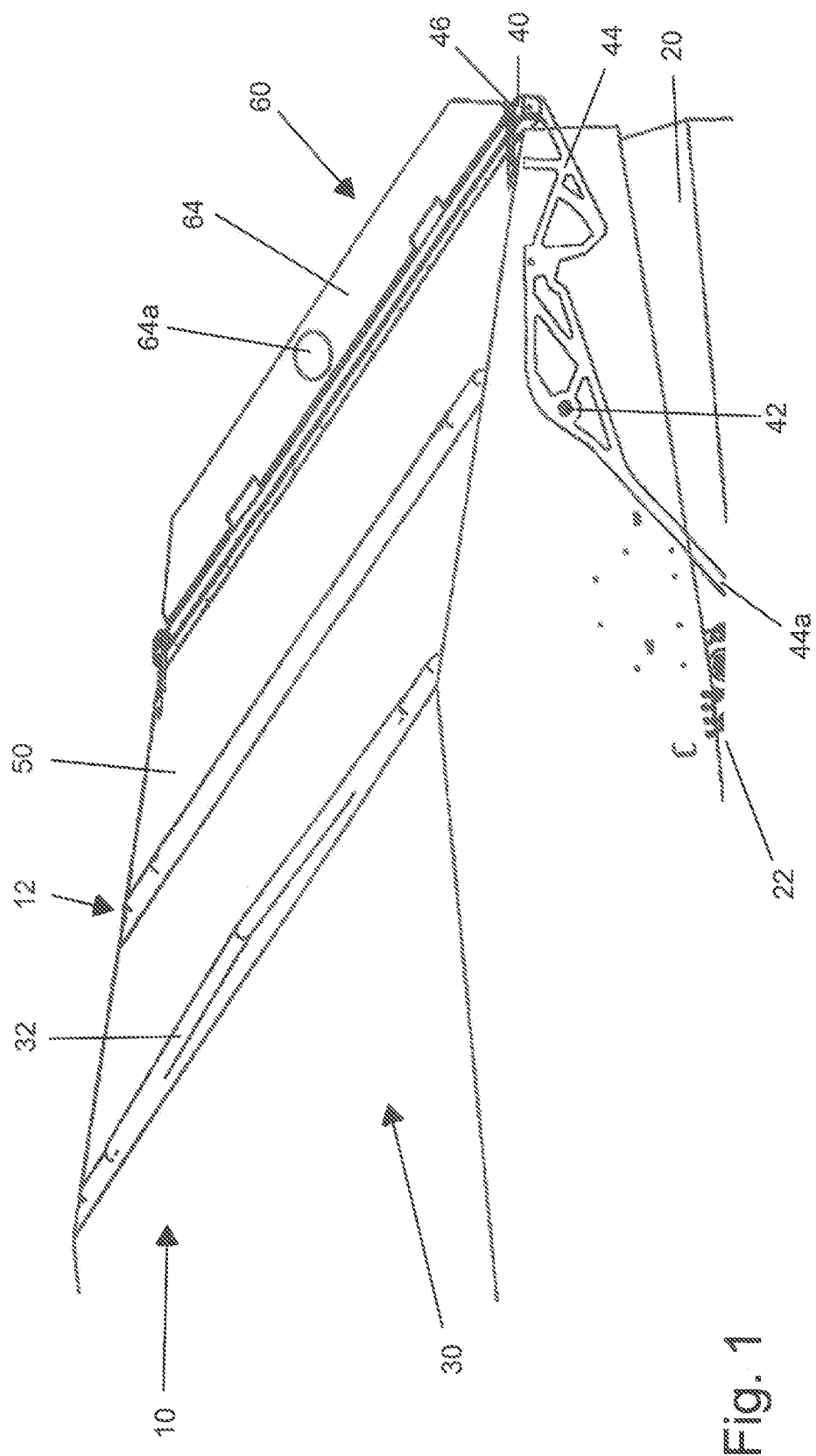
FIG. 1 is a perspective view of a tarpaulin superstructure according to the invention from above.
Figure 2:
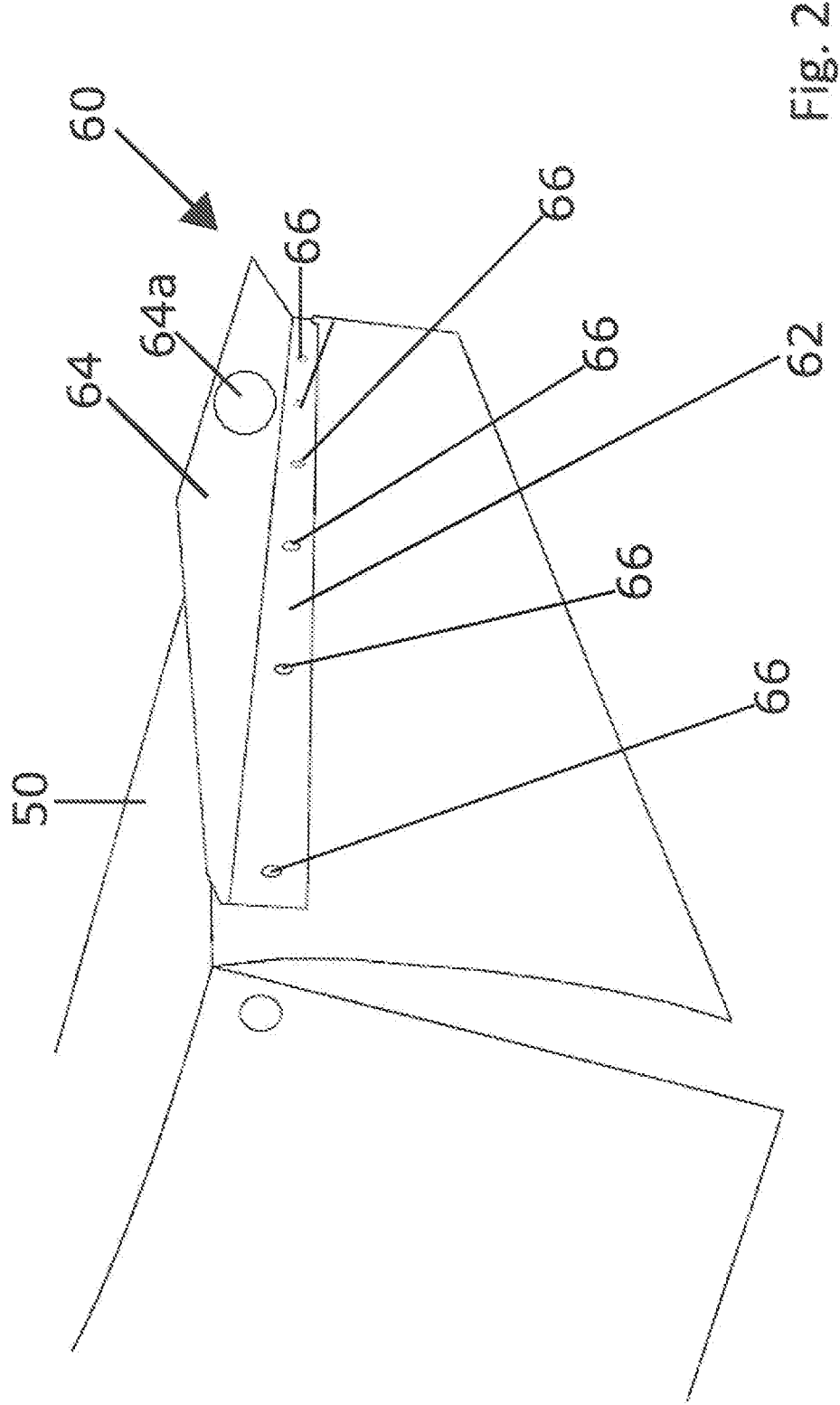
FIG. 2 is a perspective view of the tarpaulin superstructure from FIG. 1 from the rear.

The tarpaulin superstructure 10 shown in FIG. 1 and FIG. 2 is built over a substructure 20, in the present case designed as a dump-truck container, and forms a sliding roof 12 which can be opened by actuation from one side.

The details of the substructure 20 are not shown further, but the substructure has a pivoting door on its right-hand side in FIG. 1, which allows the load to be tipped.

A top frame 30 can be moved on a guide 22 of the substructure 20 and comprises a plurality of struts 32 which are designed in an inverted U-shape and have carriages (not shown in detail) at the ends that can be moved along the guide 22.

An end runner 40 is connected in a joint 42 to the rearmost pair of carriages in the direction of travel, which pair is connected via a strut 32, and the end runner 40 has a link 44 on each side of the substructure 20 which, together with a rear cross member 46, forms a U-shaped end runner 40 which can be pivoted about the articulation 42.

A tarpaulin 50 which covers the top frame 30 and can be moved together with the top frame 30 is connected to the struts 32 and to the cross member 46. At its end remote from the cross member 46, the link 44 has a lever arm 44a which cooperates with a protrusion provided on the substructure 20 and causes the end runner to pivot about the articulation 42 when the top 12 is opened to expose the upper opening of the substructure 20.

The tarpaulin 50 is placed over the end runner 40 and in particular also covers the cross member 46. On the outside of the tarpaulin 50, an air deflection part 60 is provided which comprises a connecting portion 62 that corresponds approximately to the height of the cross member 46 and an air guiding portion 64 projecting at an angle therefrom, which in this case are made of stainless steel. However, it is possible to form the air deflection part from plastics material or aluminum instead.

The connecting portion 62 is connected to the cross member 46 of the end runner 40 via rivets 66 in such a way that the tarpaulin 50 is held between these two parts 62, 46. This ensures that the tarpaulin 50 is reliably connected to the top frame 30 and in particular to the end runner 40 and here in turn to the cross member 46.

The air guiding portion 64 has an approximately trapezoidal contour which has rounded edges in order to avoid cutting into the tarpaulin 50 when the top frame 30 is folded up as it is opened. The air guiding portion 64 protrudes vertically slightly above the tarpaulin 50, so that a dynamic pressure of the airstream results in a force component in a vertically downward direction on the end runner 40 around the articulation 42. One or more air openings 64a are provided in the air guiding portion 64, and can also form the manufacturer's logo at the same time. This advantageously reduces the air resistance of the air guiding portion.

It is possible to design the air guiding portion 64 as a coplanar extension of the connecting portion 62, since the connecting portion 62 is oriented approximately vertically. However, for aesthetic reasons and because of the better dynamic behavior at different speeds, the air guiding portion is angled at an angle of approximately 135° with respect to the connecting portion.

It is possible to provide a plurality of air guiding portions on the air deflection part 60 which are spaced apart from one another, and as a result to provide recesses in the air guiding portion 64.

If the substructure 20 equipped with the tarpaulin superstructure 10 is moved by a vehicle, the end runner 40 points to the rear in the direction of travel. The airstream, which falls a little way over the tarpaulin superstructure 10 in the direction of the cross member 46, tends to suck the end runner 40 upward. The air deflection part 60 and in particular its air guiding portion 64 creates a dynamic pressure which, depending on the speed, directs a force component of 0.6 to 4 times the speed in km/h downward as a force in N and thus prevents the end runner 40 from being lifted. With a factor of 1.2 and a speed of 50 km/h, this results in a closing force of 60 N, for example. This advantageously makes it possible to dispense with locking the end runner 40 to the substructure 20 or to the top frame 30. This is particularly advantageous if the top frame 30 is equipped with a motor drive which, in the case of separate manual locking, is laborious and prone to failure.

The invention has been explained above on the basis of an embodiment in which the air guide deflection part 60 extends practically over the entire width of the cross member 46 of the end runner 40. It has to be understood that the air deflection part may also make up only a part, for example a central region, of the cross member 46 or that an air guiding portion 64 is provided over only part of the width of the cross member 46.

The invention has been explained above on the basis of an embodiment in which the substructure 20 is a dump truck, in which it is particularly advantageous for the end runner 40 to lift off from the substructure 20 when the substructure 20 is pivoted upward by up to 90°. It has to be understood that an air deflection part 60 can also be connected to end runners which are built over non-pivotable substructures, such as on the sliding roof of a truck, semi-trailer, trailer or container.

The invention has been described above with reference to a movable substructure which in particular provides for an internal combustion engine and/or a vehicle driver. It has to be understood that the movable substructure can also have an electric motor and/or can be designed as a driverless or autonomous vehicle.

While certain representative embodiments and details have been shown for purposes of illustrating the invention, it will be apparent to those skilled in the art that various changes may be made without departing from the scope of the disclosure, which is further described in the following appended claims.

The invention claimed is:

1. A tarpaulin superstructure for a movable substructure, comprising a top frame to which a tarpaulin made of weather-resistant material can be attached,
   wherein the top frame comprises a plurality of struts which can be moved along at least one guide,
   wherein the end of the top frame comprises an end runner which can be raised to open the superstructure and lowered to close the superstructure, and
   wherein an air deflection part is arranged at an end of the end runner, by means of which air deflection part an airstream is converted into a force in the closing direction of the end runner.

2. The tarpaulin superstructure of claim 1, wherein the air deflection part is arranged on the outside of the tarpaulin.

3. The tarpaulin superstructure of claim 1, wherein the air deflection part is connected to the end runner.

4. The tarpaulin superstructure of claim 1, wherein the air deflection part comprises a connecting portion and an air guiding portion, and wherein the air guiding portion protrudes upward over the tarpaulin.

5. The tarpaulin superstructure of claim 4, wherein the air guiding portion is folded away with respect to the connecting portion.

6. The tarpaulin superstructure of claim 4, wherein the air guiding portion comprises at least one of an opening and a recess.

7. The tarpaulin superstructure of claim 4, wherein the air guiding portion makes up only part of a width of the end runner.

8. The tarpaulin superstructure of claim 1, wherein the air deflection part comprises a supernatant over the superstructure which, measured in the projection onto a vertical plane, is not exceeding 50 mm.

9. The tarpaulin superstructure of claim 1, wherein the air deflection part generates a contact force of between 30 N and 300 N, preferably between 50 N and 150 N, on the end runner in the closing direction at a driving speed of 50 km/h.

10. The tarpaulin superstructure of claim 1, wherein the end runner is articulated on the top frame.

11. The tarpaulin superstructure of claim 1, wherein the air deflection part is arranged at a distal end of the end runner.

12. The tarpaulin superstructure of claim 1, wherein a vertical component of the air deflection part opposes an airstream and thus achieves a downward contact pressure or contact force on the end runner.

13. The tarpaulin superstructure of claim 1, wherein the air deflection part is designed as one of a steel part and a plastics part.

14. A movable substructure, comprising
a tarpaulin superstructure having a top frame to which a tarpaulin made of weather-resistant material can be attached,
wherein the end of the top frame comprises an end runner which can be raised to open the superstructure and lowered to close the superstructure, and
wherein an air deflection part is arranged at an end of the end runner, such that the air deflection part converts an airstream generated by a driving movement of the substructure into a force in the closing direction of the end runner.

15. The movable substructure of claim 14, wherein the tarpaulin superstructure forms a sliding roof.

16. The movable superstructure of claim 14, wherein the air deflection part makes up only part of a width of the end runner.

17. The movable substructure of claim 14, wherein the top frame comprises a plurality of struts which can be moved along at least one guide arranged on the substructure, wherein the end runner comprises two links pivotedly attached in a respective joint to one of the struts, wherein the two levers are both connected to a rear cross member, and wherein the two levers and the rear cross member are free to pivot around the joints during a travel of the substructure.

18. The movable substructure of claim 1, wherein the movable substructure is selected from a group consisting of a truck, a trailer, a semitrailer, a railway wagon, a dump truck, and a container.

19. The movable substructure of claim 14, wherein the movable substructure is selected from a group consisting of a truck, a trailer, a semitrailer, a railway wagon, a dump truck, and a container.

* * * * *